INVENTOR.
Daniel S. Sanborn &
Earl A. Kops
BY
ATTORNEY

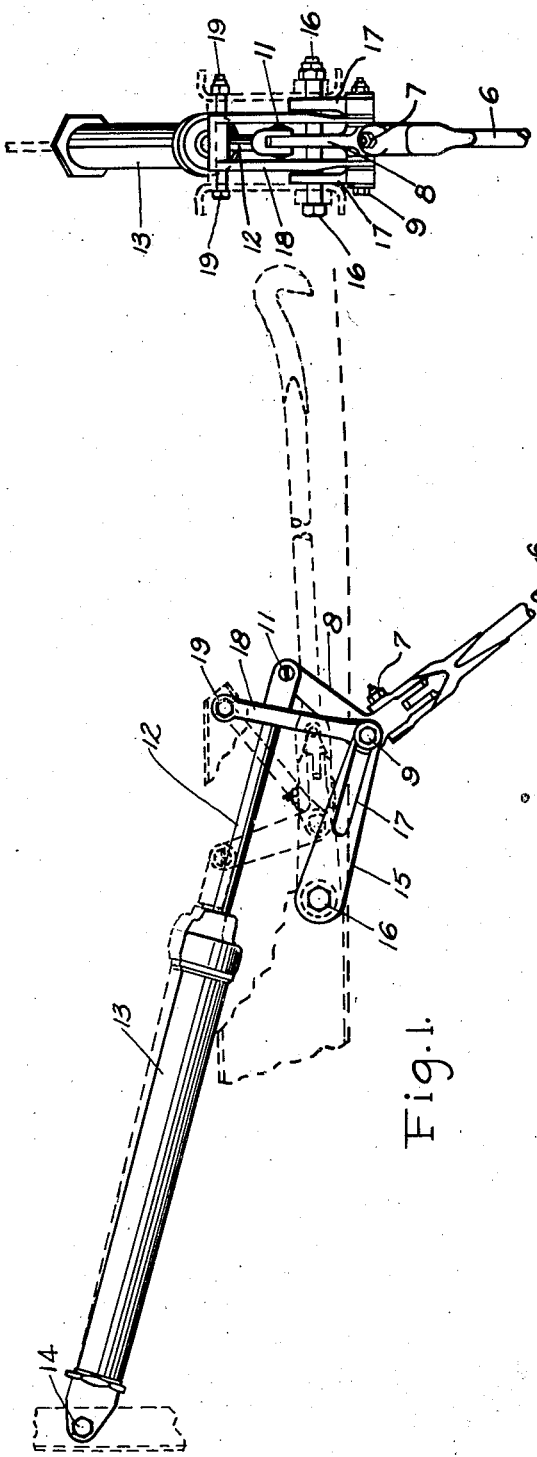

Patented Oct. 7, 1947

2,428,684

UNITED STATES PATENT OFFICE 2,428,684

ARRESTING HOOK RETRACTING MECHANISM

Daniel S. Sanborn and Earl A. Kops, San Diego, Calif., assignors to The Ryan Aeronautical Co., San Diego, Calif., a corporation of California Application March 28, 1945, Serial No. 585,278

10 Claims. (Cl. 244—110)

Our invention relates to an arresting gear operating means for use in connection with carrier based airplanes, for arresting an airplane when landing and for stowing the arresting hook in the airplane.

In order to maintain the most efficient aerodynamic character of the airplane, it is desirable to retract the arresting gear and stow the same inwardly of the skin surface of the fuselage, especially in the case when the airplane is equipped with tricycle landing gear. The position of the arresting gear when used with tricycle landing gear is considerably forward of the tail of the airplane and interrupts the slip stream if left protruding from the fuselage of the airplane. In the design of high speed airplanes such aerodynamic considerations are very critical.

As the landing operation of carrier based airplanes is dependent on the engagement of the arresting hook of the airplane with the cable on the landing deck, it is desirable to prevent bouncing of the hook on the landing deck.

In order to be reliable, the hook must travel in close engagement with the landing deck so that it does not jump the arresting cable. Such operation of the hook is accomplished by the provision of hydraulic dampening means, which resists the bouncing tendency of the hook as it contacts the landing deck.

In the drawings accompanying this specification,

Fig. 1 is a side elevational view of the mechanical structure of our arresting gear operating means, showing stationary structure of the airplane by dash lines and also showing the stowage of the arresting hook by dash lines.

Fig. 2 is an end view taken of the structure as shown in Fig. 1.

Fig. 3 is a dash line view of an airplane showing our arresting gear operating means in connection therewith.

Similar characters of reference refer to similar parts and portions throughout the several views of the drawings.

Figure 4:
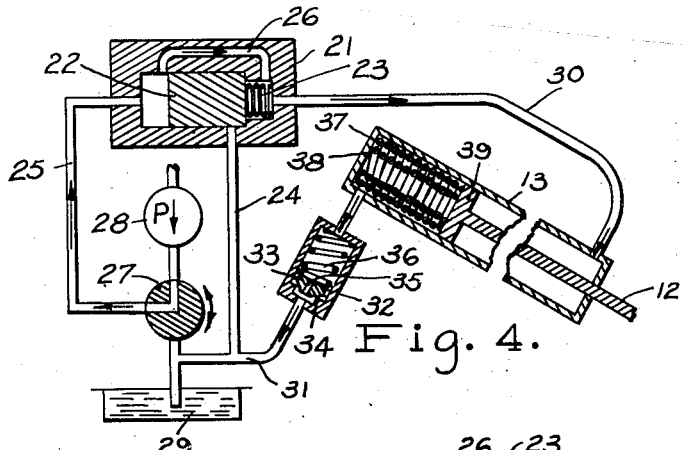
Fig. 4 is a diagrammatic view of the hydraulic equipment of our arresting gear operating means, showing the retraction of the cylinder plunger.

The arresting hook 5 is a conventional hook member adapted to engage the arresting cable on aircraft carrier decks, not shown, and is provided with a shank 6, which is pivoted laterally of the aircraft axis on the bolt 7, which is mounted in the bellcrank member 8. This bellcrank member 8 is pivoted on the bolt 9, which is near the upper end of the hook member 5, and the bolt 9 forms the pivotal axis of the hook member 5. The bell crank member 8 is connected by a bolt 11 to the plunger shaft 12 of the hydraulic cylinder 13. The hydraulic cylinder 13 is stationarily pivoted to the structure of the airplane by the bolt 14. The track member 15 is stationarily pivoted to structure of the airplane by the bolt 16, and is provided with slotted track portions 17, in which the bolt 9 is slidably mounted. The link member 18 is stationarily pivoted on the bolt 19, in connection with structure of the airplane. The opposite ends of the link 18 are positioned on the bolt 9, and guide the bolt 9 in an arcuate path as it slides in the slotted track portions 17.

Figure 6:
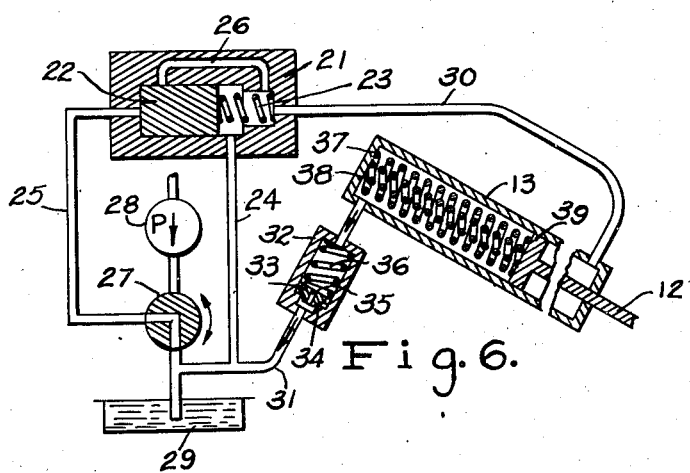
Fig. 6 is another similar view to Fig. 4, showing the bleeder valve in operative position, whereby dampening of the cylinder plunger is effected.

Communicating with the hydraulic cylinder 13 through the tube 30, is a bypass valve 21, in which is slidably positioned the piston 22. A spring 23 in the bypass valve 21 tends to hold the piston 22 in the position as shown in Fig. 6. Communicating with the bypass valve 21 is a suction tube branch 24 which is shut off by the piston 22 in the position as shown in Fig. 4.

Communicating with the bypass valve 21 is a pressure tube 25. Within the bypass valve 21 is a passage 26 which communicates with opposite ends of the piston 22 when in the position as shown in Fig. 4.

Communicating with the pressure tube 25 is the three-way valve 27 which either interconnects the pump 28 and the pressure tube 25 or the pressure tube 25 and the reservoir 29.

Figure 5:
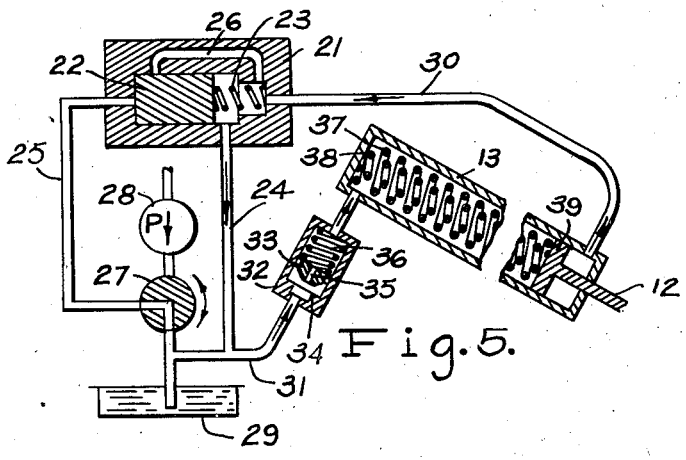
Fig. 5 is a similar view to Fig. 4, showing the extension of the cylinder plunger.

The suction tube 31 intercommunicates the reservoir 29 and the bleeder valve 32. The bleeder valve 32 communicates with the opposite end of the hydraulic cylinder 13 from the extended plunger 12 and tends to dampen the action of the plunger when traveling inwardly into the hydraulic cylinder 13. The bleeder valve 32 is provided with a slidably mounted bleeder piston 33, having a seat 34 which when closed limits the passage of liquid to the orifice 35. When this valve seat 34 is open as shown in Fig. 5, liquid passes in volume through notches in the periphery of the piston 33. The spring 36 tends to hold the seat 34 closed. The spring 36 is compressed by the force of liquid entering from the reservoir suction tube 31.

The springs 37 and 38 tend to extend the plunger shaft 12 of the hydraulic cylinder 13 with a corresponding extension of the hook 5.

The operation of the arresting hook operating means is substantially as follows:

When landing, the airplane to which the arresting gear operating means is attached, the valve 27 is turned to the position as shown in Fig. 5, relieving the pressure on the piston 22 and permitting the spring 23 to force the piston 22 away from the suction tube branch 24. The springs 37 and 38 force the plunger 12 from the cylinder 13, causing suction on the bleeder valve 32 and drawing liquid from the other side of the plunger piston through the tube 30, bypass valve 21, and the suction tube branch 24.

As the hook 5 contacts the landing deck, it has a tendency to bounce, but is dampened by the restriction of the liquid passing through the orifice 35 of the bleeder valve 32. The hook 5 is thereby maintained and held closely to the landing deck by the springs 37 and 38.

When retracting the hook 5, the valve 27 is turned to the position as shown in Fig. 4 of the drawing, whereby hydraulic pressure is conveyed from the pump 28 through the pressure tube 25 to the bypass valve 21. The piston 22 is forced against the spring 23, compressing the same and closing the suction tube branch 24. Hydraulic pressure is conducted by the passage 26 to the tube 30 and against the piston 39 on the plunger shaft 12. Liquid passes from the opposite side of the piston 39 through the bleeder valve 32. As the plunger 12 retracts into the hydraulic cylinder 13, the bolt 9 slides in the slotted track portions 17 to the end thereof, while the link 18 causes the bolt 9 to travel in an arcuate path about the axis furnished by the bolt 19, thereby raising the pivotal axis of the hook member 5. When the bolt 9 has reached the end of the slotted track portions 17, the bell crank member 8 is pivoted on the bolt 9 and the hook member 5 is pivoted and stowed in the airplane as shown by dash lines in Fig. 1 of the drawings.

Having thus described our invention, what we claim as new and desire to secure by Letters Patent is:

1. In an arresting hook operating gear for airplanes, a track member pivotally connected to the airplane, a hook member pivotally slidable in the track member, and means for elevating the hook member and stowing the same within the airplane substantially parallel to the longitudinal axis thereof.

2. In an arresting hook operating gear for airplanes, a track pivotally connected to an airplane and extending downwardly below the fuselage of the airplane, a hook member pivotally slidable in the track, and means for elevating said track and hook member for stowing the same wholly within the fuselage of said airplane.

3. In an arresting hook operating gear for airplanes, a hook member having a hook portion on one end and pivotally connected to an airplane near its other end, a track supporting said hook member whereby said hook member near its said other end is movable along said track, means for elevating said track and actuating means for elevating and stowing said hook member in the airplane.

4. In an arresting hook operating gear for airplanes, a hook member having a hook portion on one end, a track pivotally connected to an airplane and supporting said hook member near its other end, whereby said hook member is movable along the track, a link stationarily pivoted at one end to the airplane and arranged to elevate the track at its other end when said hook member moves along the track, and actuating means arranged to pivot said hook member and move the same along the track.

5. In an arresting hook operating gear for airplanes, a hook member having a hook portion on one end and pivotally connected to an airplane near its other end, a track supporting said hook member whereby said hook member near its said other end is movable along said track, means for elevating said track and actuating means for elevating and stowing said hook member in the airplane, said hook member pivotal laterally of the axis of said airplane.

6. In an arresting hook operating gear, a hook member having a hook portion on one end and pivotally connected near its other end to an airplane, a link stationarily pivoted on said airplane at one end and pivotally connected on a common axis with said hook member at its other end, and a track pivotally connected to said airplane and supporting said hook member, whereby the axis of said hook member is movable along the track, and whereby the pivotal movement of said link elevates said track together with said hook member.

7. In an arresting hook operating gear, a hook member having a hook portion on one end and pivotally connected near its other end to an airplane, a link stationarily pivoted on said airplane at one end and pivotally connected on a common axis with said hook member at its other end, and a track pivotally connected to said airplane and supporting said hook member, whereby the axis of said hook member is movable along the track, and whereby the pivotal movement of said link elevates said track together with said hook member, a hydraulic cylinder in connection with said hook member arranged to pivot the hook member and stow the same in the airplane.

8. In an arresting gear for airplanes, a hook member having a hook portion on its extended end and extendable below the fuselage of an airplane, an hydraulic cylinder provided with a plunger connected to said hook member, a spring in said cylinder arranged to extend the hook member, a suction tube communicating with one end of the cylinder, a pressure conductor communicating with the other end of the cylinder, a bypass valve having inlet and outlet passages interconnecting said suction tube and said pressure conductor, whereby fluid expelled through said pressure conductor from said cylinder is issued into said suction tube, and whereby fluid passing through said pressure conductor to said cylinder bypasses the suction tube, a three-way valve communicating with the inlet side of said bypass valve, and a reservoir communicating with said three-way valve and said suction tube.

9. In an arresting hook operating gear for airplanes, a hook member having a hook portion on one end and pivotally connected to an airplane near its other end, a track supporting said hook member whereby said hook member near its said other end is movable along said track, means for elevating said track and actuating means for elevating and stowing said hook member in the airplane, a bell crank member providing the pivotal mount for said hook member whereby the hook member is pivotally mounted laterally of said airplane on said bell crank member, and is pivotal vertically with said bell crank member.

10. In an arresting hook operating gear for airplanes, a hook member having a hook portion on one end and pivotally connected to an airplane near its other end, a track supporting said hook member whereby said hook member near its said other end is movable along said track, means for elevating said track and actuating means for elevating and stowing said hook member in the airplane, a bell crank member providing the pivotal mount for said hook member whereby the hook member is pivotally mounted laterally of said airplane on said bell crank member, and is pivotal vertically with said bell crank member, said bell crank member provided with an extending arm portion connected with said actuating means.

DANIEL S. SANBORN.
EARL A. KOPS.

REFERENCES CITED

The following references are of record in the file of this patent:

UNITED STATES PATENTS

| Number | Name | Date |
|---|---|---|
| 1,562,549 | Hall | Nov. 24, 1925 |
| 1,749,438 | Minshall | Mar. 4, 1930 |
| 2,147,536 | Levy | Feb. 14, 1939 |
| 1,966,956 | Dunn | July 17, 1934 |
| 2,132,721 | Clarke | Oct. 11, 1938 |
| 2,001,620 | Levy | May 14, 1935 |

FOREIGN PATENTS

| Number | Country | Date |
|---|---|---|
| 398,977 | Great Britain | Mar. 30, 1933 |
| 346,906 | Italy | Mar. 11, 1937 |